UNITED STATES PATENT OFFICE.

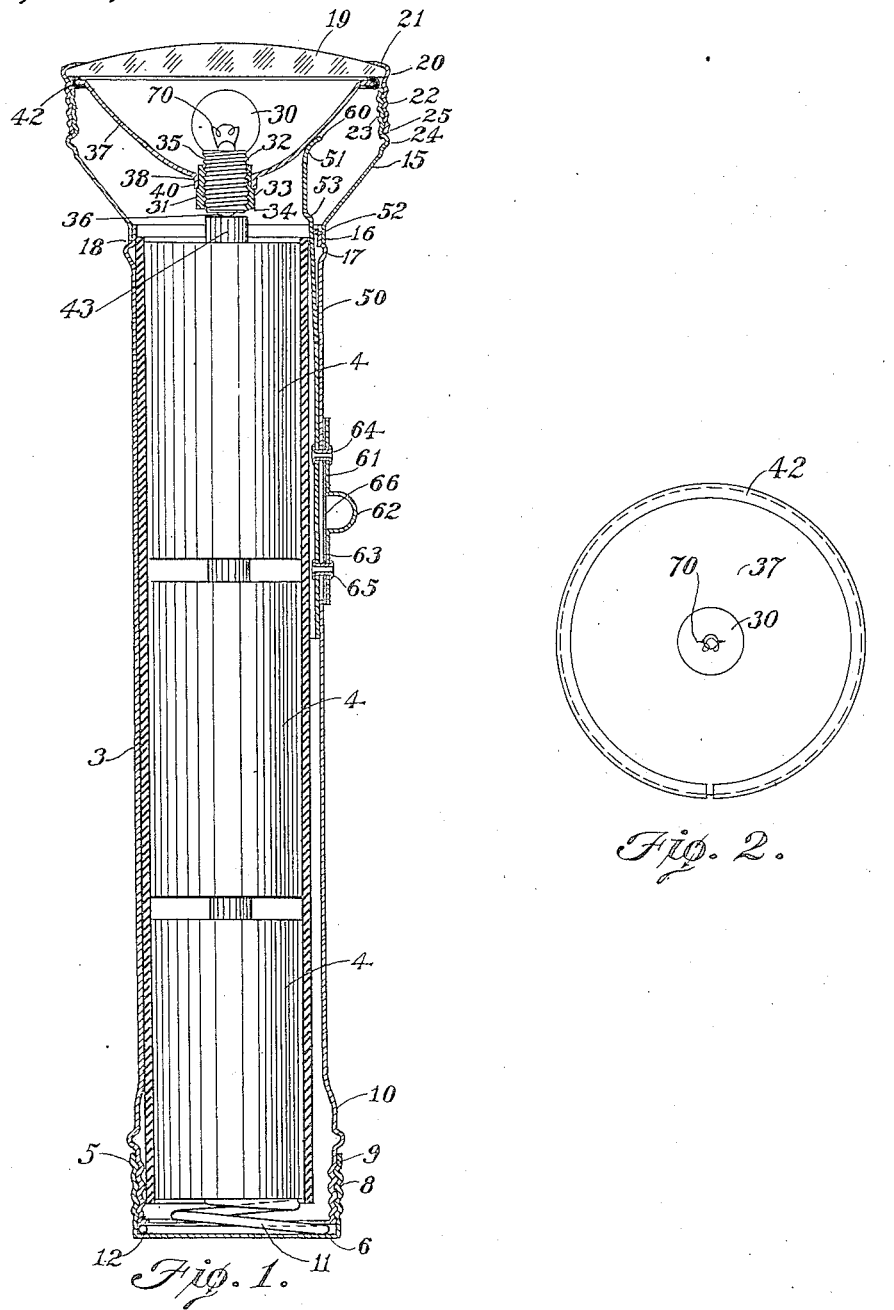

RICHARD MAX EATON, OF NIAGARA FALLS, NEW YORK, ASSIGNOR TO THE NIAGARA SEARCHLIGHT COMPANY, OF NIAGARA FALLS, NEW YORK, A CORPORATION OF NEW YORK.

FLASHLIGHT DEVICE.

1,094,839.  Specification of Letters Patent.  Patented Apr. 28, 1914.

Application filed October 2, 1913. Serial No. 792,914.

*To all whom it may concern:*

Be it known that I, RICHARD MAX EATON, a citizen of the United States, residing at Niagara Falls, in the county of Niagara and State of New York, have invented certain new and useful Improvements in Flashlight Devices; and I do hereby declare the following to be a full, clear, and exact description of the invention, such as will enable others skilled in the art to which it appertains to make and use the same.

This invention relates to searchlights or flashlights, the casings for the same and their batteries, and the circuit connections and arrangement of such casings.

Flash or searchlights of the type to which my invention relates are used for various purposes, such as police work, work about automobiles, etc. In the use about automobiles, when the flashlight is not in use, it is frequently placed in the tool box or in association with metal tools where frequently the tools will complete the connections, or such connections will be completed by the metallic parts of the machine and the energy of the batteries expended uselessly. For example, where the circuit is closed by connecting together two exposed parts, a tool touching each of these parts will complete the circuit and the batteries will become exhausted through useless burning of the lamp.

One of the objects of my invention is to eliminate insulated tubings which readily wear away and become useless.

Another object of my invention which I attain is the construction of the entire casing of the flashlight of metal which can be made to present a more attractive appearance and which is more durable than those covered or partly covered with insulating material.

Other objects of my invention and the invention itself will probably be better understood from a description of the particular embodiment of the invention illustrated in the drawing.

Referring now to the drawing and to the embodiment illustrated therein, Figure 1 is a cross section through an embodiment of my invention, illustrating the batteries and lamp in elevation. Fig. 2 is a front view of the reflector showing the insulation used.

At 3 I show the main portion of the casing, here illustrated as tubular in form to properly accommodate the cylindrical batteries 4, though of course, this casing may be of any convenient form. As shown, both ends of the casing are open. Suitable means for closing the lower end is provided, and is here illustrated as a cap 6 connected to the casing in any suitable manner, as by threads 8 upon the cap and 9 upon the lower end of the casing. The lower end of the casing may be expanded as shown at 10 for the purpose of forming an elevation around the end of the casing, so that the same will not readily slip from the hand of the user. Means are provided for connecting the casing to one of the poles of the battery, here illustrated as a spring 11, preferably a coil spring, placed in the cap 6 and having a lower outer coil 12 which expands in the bottom of the cap and holds the spring firmly in the cap. The batteries 4 are placed in the casing and the cap screwed down, placing the spring under compression and making a thorough contact.

A funnel-shaped member 15 is provided upon the other end of the casing, here illustrated as a separate member connected at 16 to the tube of the casing 3, an annular collar 17 being preferably formed upon the casing 3 against which the edge 18 of the member abuts. Means are provided for protecting the lamp and for transmitting the light, which is here shown as a lens 19 mounted upon the funnel-shaped member 15 and held thereon by an annular member 20 folded at 21 over the edge of the lens. The lens may be fastened in the member 20, the two forming a cap which is fastened to the member 15 in any suitable manner, such as by threads 22 upon the lens and 23 upon the member 15. An annular collar 24 is formed upon the member 15 against which the edge 25 of the cap 20 abuts. The lamp is shown at 30, a socket therefor at 31, in which the lamp is fastened by any suitable means, such as threads 32 upon the lamp and 33 upon an interior bore 34 in the socket into which the lamp is screwed. The base part 35 of the lamp forms one of the poles, the other being shown at 36.

Suitable means are provided for mounting the lamp in the member 15, here shown as a reflector 37 having an opening 38 in the center into which the lamp socket is mounted by any suitable means, such as a collar 40 on the reflector. The member 37 is insulated from the parts described by insulating material, which preferably consists of a thin layer 42 of insulating material folded over the edge of the reflector and insulating the edge of the same from the casing, as illustrated in Fig. 1. No other parts of the reflector touch the casing, so that this thin layer of insulation is sufficient to insulate the lamp terminals one from the other until it is desired to complete the circuit therethrough. It will be seen that the insulation thus employed is concealed so that it cannot be worn away or otherwise injured through the normal use of the instrument. I also completely conceal all of the connections to one of the terminals of the lamp so that the same cannot be reached from the outside and connected through some metallic instrument with the other terminal, causing a useless expenditure of energy and exhaustion of the batteries.

When mounted in the casing, one pole of the battery is connected to the casing through the spring 11, as described, and the other pole of the battery 43 is connected directly to the terminal 36 of the lamp, leaving the circuit between the member 37 and the casing open. I provide suitable means to close this gap in the circuit when it is desired to operate the lamp. This means is here shown as a movable member 50 which engages the casing through contact therewith and which is slidable in said casing to engage the reflector at 60, as illustrated in Fig. 1, the end 51 of the member 50 being turned up to form a sliding contact with the reflector so as to insure a bright surface due to the rubbing of the end 51 of the member 50 over the part 60 of the reflector 31, and thereby a good contact.

A lug 52 is provided near the edge of the casing upon which the member 51 rests and over which it is bent when slid down against the reflector. A catch 53 is provided upon the member 50 into which this lug fits, preventing inadvertent movements of the member 50 when the signal is restored. I provide suitable means for operating the member 50, which here consists of a catch 61 made of a long flat piece of metal folded up at 62 to form a finger-hold. A slot 63 is formed in the casing 3 through which the member 61 is connected to the member 50 by suitable means, such as rivets 64 and 65. The member 61 is insulated from the casing by a layer of thin insulating material 66 to prevent the electric current from reaching the finger of the operator.

When it is desired to retire the signal, the member 61 is pushed toward the cap 6, the edges of the slot 63 serving as guides for the switch, said slot being just about the width of the rivets 65. This withdraws the end 51 of the member 50 from the reflector, leaving the circuit of the lamp open, so that it will not be operated.

When it is desired to operate the lamp, the member 61 is pushed in the other direction to the position shown in Fig. 1, when the circuit of the lamp is completed as follows: from the terminal 36, pole 43 of the battery, through the batteries here connected in series to the lower pole of the lower cell 4, which is exposed and engages the spring 11, through the spring 11, the casing 3, the member 50, the end 51 of the member 50, the reflector 37, the lamp socket, the part 35 of the lamp, through the filament 70 and to the other terminal 36 of the lamp, completing the circuit. The lamp is operated over this circuit as long as desired, the insulating material at 42 preventing the current from shunting through the reflector and the casing. It will also be seen that I have eliminated all soldered connections, which are so detrimental to present devices of this character which are now in use. Owing to the fact that a foaming battery causes corrosion of the small connected strips and opens the circuit. By my invention I am able to employ a permanent casing having no soldered connections of any kind and eliminating the danger of the opening of the circuit through the corrosion of the solder and the consequent insulation of the two soldered parts from each other caused by the conversion of the solder, a conducting material, into a salt, or corrosion of the solder which is an insulating material. I have illustrated this embodiment of my invention for the purpose of explaining the invention, and not with the intention of being limited to the form and details illustrated, since I contemplate numerous and extensive departures from such form and details.

I claim:—

1. In a device of the class described, the combination of a metal casing, means within said casing for generating an electric current, an insulating cover for said generating means, an electric lamp in said casing, means for mounting the lamp in said casing, means entirely within the casing to insulate one terminal of the lamp from the other and means accessible from the outside of the casing for connecting the terminals of the lamp in a circuit including the generating means.

2. In a device of the class described, the combination of a metal casing, means in said casing for generating electric current, an insulating cover for said generating means, a lamp in said casing, means entirely within the casing for insulating one of the terminals of the lamp from the other and means for connecting the terminals of the lamp in a circuit with said generating means, whereby the lamp is operated.

3. In a device of the class described, the combination of a tubular casing, a cell or a battery of cells in said casing, means for connecting one pole of said cell or battery of cells to said casing, a lamp, a lamp reflector, a lamp socket in said reflector, one of the terminals of the lamp being connected to said reflector through said socket, the other terminal of the lamp being connected directly to the other pole of the cell or battery of cells, a layer of insulating material around the rim of the reflector where the same is mounted in the casing, the other parts of the reflector being disengaged from the casing, a slidable member engaging the casing, a slot in the casing, a catch on the outside of the casing, means for connecting the slidable member to the catch extending through the casing, said slidable member engaging the reflector when operated, placing the casing in electrical communication with the reflector and completing a circuit through the lamp and cell or battery of cells including the reflector, the slidable member and the casing.

4. In a device of the class described, the combination of a casing, means in said casing for generating an electric current, a lamp in said casing, a lamp reflector connected to one of the terminals of the lamp, the other terminal of the lamp being connected to said generating means, means separate from the casing within said casing for insulating the reflector from the casing, a member for connecting the casing to the reflector when desired and completing an electrical connection between the lamp and the generating means and a device accessible from the outside for bringing said member into engagement with said reflector and disengaging it therefrom.

5. In a device of the class described, the combination of a metal casing, means for generating an electric current, an insulating cover for the generating means, a lamp mounting means for mounting the lamp within the casing, insulating means within the casing for insulating the lamp mounting means from the casing and means accessible from the outside of the casing for bringing said lamp mounting means in electrical engagement with the casing to operate said lamp.

6. In a device of the class described, the combination of a casing, means in said casing and separate from the casing for generating an electric current, means to connect one pole of said generating means to said casing, a lamp in said casing having a terminal connected to the other pole of said generating means, insulating means entirely within the casing for insulating the other terminal of the lamp from the casing, apparatus for electrically connecting said insulated terminal of the lamp with said casing and means accessible from without the casing for operating said apparatus.

7. In a device of the class described, the combination of a casing, means within said casing and separate from the casing for generating an electric current, a lamp in said casing, a reflector for said lamp connected to one of the terminals thereof and mounted in said casing, means entirely within said casing for insulating said reflector from one pole of said generating means, the other pole of the generating means being connected to the other terminal of the lamp and means to connect said reflector to the last named pole of the generating means to operate said lamp.

8. In a device of the class described, the combination of a metal casing, a lamp in said casing, a reflector in the casing connected to one terminal of the lamp, insulating means separate from and within the casing between the casing and the reflector insulating the casing from the reflector, means in said casing for generating an electric current to operate the lamp and apparatus for connecting the lamp and generating means in a circuit.

In witness whereof I have signed my name in the presence of two witnesses this 29 day of September, 1913.

RICHARD MAX EATON.

Witnesses:
 STACIA BAKER,
 CORYDON WILLARD EATON.